(12) United States Patent
Wu et al.

(10) Patent No.: US 10,409,403 B2
(45) Date of Patent: Sep. 10, 2019

(54) TOUCH SCREEN WITH ESD PROTECTION CIRCUIT AND DEVICE INCLUDING THE SAME

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Lingyan Wu, Beijing (CN); Lei Zhang, Beijing (CN); Taofeng Xie, Beijing (CN); Guangchao Wei, Beijing (CN); Yang Liu, Beijing (CN)

(73) Assignees: BOE TECHNOLOGY GROUP CO., LTD., Beijing (CN); HEFEI XINSHENG OPTOELECTRONICS TECHNOLOGY CO., ltd., Hefei, Anhui (CN)

( * ) Notice: Subject to any disclaimer, the term of this patent is extended or adjusted under 35 U.S.C. 154(b) by 0 days.

(21) Appl. No.: 15/528,431

(22) PCT Filed: May 6, 2016

(86) PCT No.: PCT/CN2016/081235
§ 371 (c)(1),
(2) Date: May 19, 2017

(87) PCT Pub. No.: WO2017/147998
PCT Pub. Date: Sep. 8, 2017

(65) Prior Publication Data
US 2018/0059834 A1    Mar. 1, 2018

(30) Foreign Application Priority Data

Mar. 4, 2016 (CN) ..................... 2016 2 0167486 U (51) Int. Cl.
*G06F 3/041* (2006.01)
*G06F 3/045* (2006.01)
(Continued)

(52) U.S. Cl.
CPC ............ *G06F 3/0412* (2013.01); *G06F 3/041* (2013.01); *G06F 3/044* (2013.01); *G06F 3/045* (2013.01);
(Continued)

(58) Field of Classification Search
CPC ........ G06F 3/0412; G06F 3/047; G06F 3/045; G06F 2203/04107
(Continued)

(56) References Cited

U.S. PATENT DOCUMENTS

2007/0074899 A1*  4/2007  Aonuma .................. H05K 3/44
174/260
2012/0327324 A1*  12/2012  Martisauskas .... G02F 1/133308
349/58
(Continued)

FOREIGN PATENT DOCUMENTS

CN     201955762 U    8/2011
CN     203287881 U    11/2013
(Continued)

OTHER PUBLICATIONS

English translation of PCT International Search Report, Application No. PCT/CN2016/081235, dated Dec. 14, 2016, 2 pages.
(Continued)

*Primary Examiner* — Rodney Amadiz
(74) *Attorney, Agent, or Firm* — Armstrong Teasdale LLP (57) ABSTRACT

Embodiments of the present disclosure provide a touch screen and a device. The touch screen includes a bezel region and a touch region, wherein the touch screen includes an annular wire provided on the bezel region. The wire
(Continued)

further includes at least one pair of opposing discharge terminals. The device includes the touch screen, and further includes a conductive foam configured to connect the wire and a housing of the device. According to the embodiments of the present disclosure, the ESD resistance of the touch screen and the device including the touch screen is enhanced, the service life of the touch screen and the device including the touch screen is extended, the stability of the touch screen and the device including the touch screen is improved, and customers will have a better user experience without any other additional risk.

11 Claims, 6 Drawing Sheets

(51) Int. Cl.
*G06F 3/047* (2006.01)
*G06F 3/044* (2006.01)

(52) U.S. Cl.
CPC .... *G06F 3/047* (2013.01); *G06F 2203/04103* (2013.01); *G06F 2203/04107* (2013.01)

(58) Field of Classification Search
USPC ............... 345/173–174; 178/18.01–18.08
See application file for complete search history.

(56) References Cited

U.S. PATENT DOCUMENTS

| | | | |
|---|---|---|---|
| 2013/0322038 A1* | 12/2013 | Ogawa | H01Q 9/40 361/752 |
| 2014/0028582 A1 | 1/2014 | Choi | |
| 2014/0293144 A1* | 10/2014 | Bae | G06F 3/041 349/12 |
| 2015/0049263 A1* | 2/2015 | Chu | G06F 3/041 349/12 |
| 2015/0317011 A1* | 11/2015 | Chen | G06F 3/044 345/174 |
| 2018/0046024 A1* | 2/2018 | Li | G02F 1/13338 |
| 2018/0095324 A1* | 4/2018 | Li | G02F 1/133528 |

FOREIGN PATENT DOCUMENTS

| | | |
|---|---|---|
| CN | 203376735 U | 1/2014 |
| CN | 204189150 U | 3/2015 |

OTHER PUBLICATIONS

PCT Written Opinion, Application No. PCT/CN2016/081235, dated Dec. 14, 2016, 6 pages.: with English translation of relevant part.

* cited by examiner

TOUCH SCREEN WITH ESD PROTECTION CIRCUIT AND DEVICE INCLUDING THE SAME

CROSS REFERENCE TO RELATED APPLICATIONS

This patent application is a National Stage Entry of PCT/CN2016/081235 filed on May 6, 2016, which claims the benefit and priority of Chinese Patent Application No. 201620167486.2 filed on Mar. 4, 2016, the disclosures of which are incorporated by reference herein in their entirety as part of the present application.

BACKGROUND

The present disclosure relates to the field of electronic device technology, and in particular, to a touch screen and a device.

In the electronic market, customers have increasingly high demands for the whole system being thinner and lighter, so that the layout space of Printed Circuit Board Assembly (PCBA) is gradually decreased, and more devices employ a narrow bezel design as an entirety structure. The increasingly compact layout makes the electrostatic discharge (ESD) phenomenon a greater threat to the device, which causes a greater challenge to the anti-electrostatic discharge (ESD) performance of the entire system. How to quickly conduct static electricity out to reduce the damage to the device and effectively improve the anti-ESD performance of the whole system is a problem that the electronics industry has been committed to solve.

Currently, metal wires are generally used on the periphery of and in the circuit board for the ground processing, and the ground wire is used for ESD protection at the same time. Due to the limitation of the narrow bezel and the distance between the outermost wire to the outline of the device, the ground wire actually provided is usually not wide enough, so as to cause poor ESD protection, and the static electricity cannot be discharged well. Therefore, how to achieve good anti-ESD performance, while meeting customers' requirements for narrow bezel, thinner and lighter system, and high quality, has become an urgent problem to solve in the current electronics industry.

BRIEF DESCRIPTION

Embodiments of the present disclosure provide a touch screen and a device.

A first aspect of the present disclosure provides a touch screen including a bezel region and a touch region. The touch screen includes an annular wire provided on the bezel region.

In an embodiment of the present disclosure, the wire includes at least one pair of opposing discharge terminals.

In an embodiment of the present disclosure, the discharge terminal is a sharp end.

In an embodiment of the present disclosure, the wire includes a dummy ground, a width of the dummy ground is greater than a width of the other regions of the wire.

In an embodiment of the present disclosure, the touch screen further includes a protective layer. The protective layer covers the bezel region and the touch region, and opens at a position corresponding to the dummy ground and at a position corresponding to a bonding region for connecting the touch screen and an external circuit.

In an embodiment of the present disclosure, the touch screen further includes a strippable adhesive layer. The strippable adhesive layer covers the protective layer and the dummy ground.

In an embodiment of the present disclosure, the wire is made of metal.

A second aspect of the present disclosure provides a device including the above-described touch screen. The device further includes conductive foam configured to connect the wire of the touch screen and the housing of the device.

In an embodiment of the present disclosure, the wire includes a dummy ground having a width greater than the width of the other regions of the wire. The conductive foam is connected to the dummy ground.

According to an embodiment of the present disclosure, the ESD resistance of the touch screen and the device including the touch screen is enhanced, the service life of the touch screen and the device including the touch screen is extended, the stability of the touch screen and the device including the touch screen is improved, and customers will have a better user experience without any other additional risk.

BRIEF DESCRIPTION OF THE DRAWINGS

In order to more clearly illustrate the technical solutions of the embodiments of the present disclosure, the drawings of the embodiments will be briefly described below. It should be understood that the drawings described below merely relate to some embodiments of the present disclosure rather than limiting the present disclosure, in which.

DETAILED DESCRIPTION

To make the technical solutions and advantages of the present disclosure more clear, the technical solutions of the embodiments of the present disclosure will be clearly and completely described below in conjunction with the drawings. Obviously, the embodiments described are part of embodiments of the present disclosure, instead of all the embodiments. Based on the described embodiments of the present disclosure, all other embodiments obtained by those skilled in the art without creative work also fall within the scope of protection sought for by the present disclosure.

Figure 1:
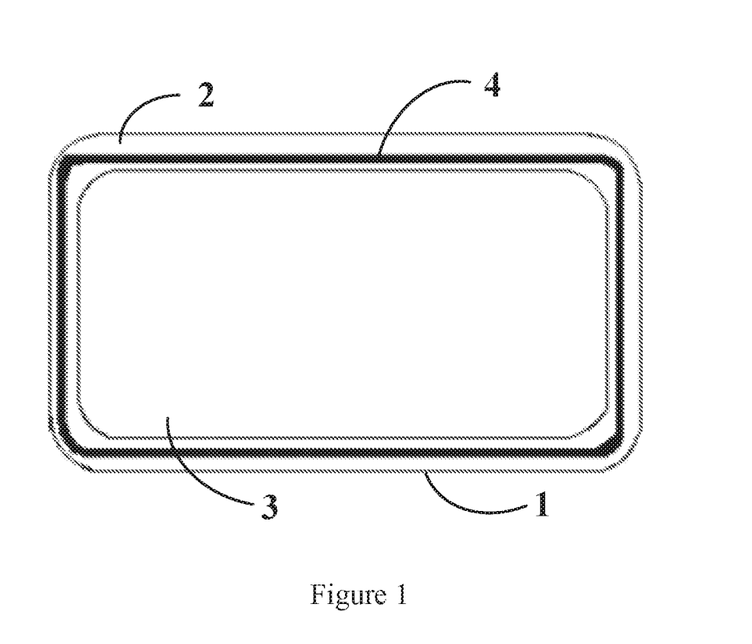
FIG. 1 is a schematic view of a touch screen according to a first embodiment of the present disclosure.

FIG. 1 is a schematic view of a touch screen according to a first embodiment of the present disclosure. As shown in FIG. 1, the touch screen 1 includes a bezel region 2 and a touch region 3, and the touch screen 1 includes an annular wire 4 provided on the bezel region 2. In the prior art, since the working current is required to flow through the ground wire among the metal wire for shielding static electricity, the effect of being used for shielding static electricity at the same time is not ideal. In this example, the independently provided annular wire 4 is dedicated to electrostatic shielding, and can improve the effect of electrostatic shielding. A complete annular wire 4 is shown in FIG. 1, but it should be understood that the actual shape of the wire 4 may vary with the setting conditions of the bezel region 2 of the touch screen 1. For example, the wire 4 may have an opening thereon and also may be bent into various shapes with the shape of the bezel region 2 of the touch screen 1. The basic purpose of the present disclosure can be realized as long as the entire shape of the wire 4 is annular. The wire 4 may be made of metal, alloy, ITO material, or other conductive material.

Figure 2:
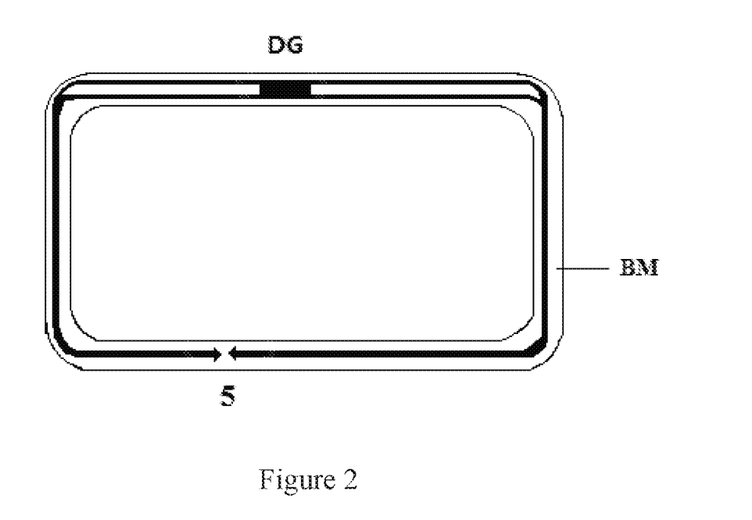
FIG. 2 is a schematic view of a touch screen according to a second embodiment of the present disclosure.

FIG. 2 is a schematic view of a touch screen according to a second embodiment of the present disclosure. As shown in FIG. 2, in this example, the touch screen 1 includes a bezel region 2 and a touch region 3, and the touch screen 1 includes an annular wire 4 provided independently on the bezel region 2. In addition, the wire 4 may include at least one pair of opposing discharge terminals 5. Also, the discharge terminal 5 may be a sharp end. The wire 4 may include a dummy ground (DG), the width of the dummy ground DG is greater than the width of the other regions of the wire 4.

The discharge terminal 5 is provided on the wire 4, and can release the electrostatic charge to prevent the touch screen 1 from being damaged. The dummy ground DG with larger width can effectively collect electrostatic charge, to achieve the conducting out of electrostatic charge. It will be apparent that the number and shape of the discharge terminals 5 and the number and shape of the dummy grounds DG can vary with different devices. For example, for a touch screen 1 having a larger area, a plurality of pairs of discharge terminals 5 and a plurality of larger dummy regions DG may be provided to facilitate rapid collection and discharge of electrostatic charges at different positions. For a touch screen 1 having a smaller area in a portable device, due to the limitation of the device space, the basic purpose of the present disclosure may be achieved with only one pair of discharge terminals 5, and with only one or no dummy ground DG.

Hereinafter, in conjunction with FIGS. 3 to 16, the description will be given by example of using a 6 Mask method to produce the touch screen 1 of this embodiment.

Figure 3:
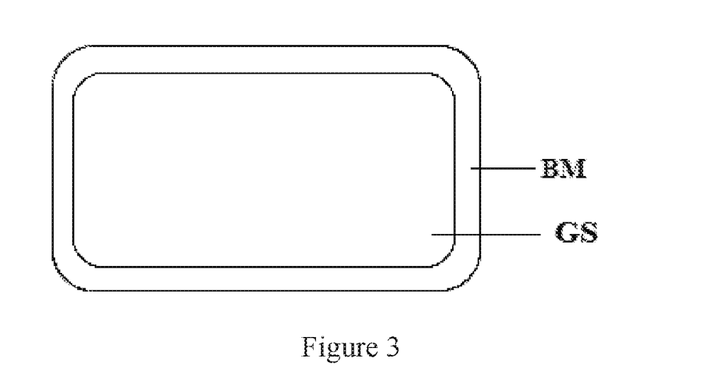
FIG. 3 is a schematic top view of the touch screen of the embodiment shown in FIG. 2 after the first step of production is completed.
Figure 4:
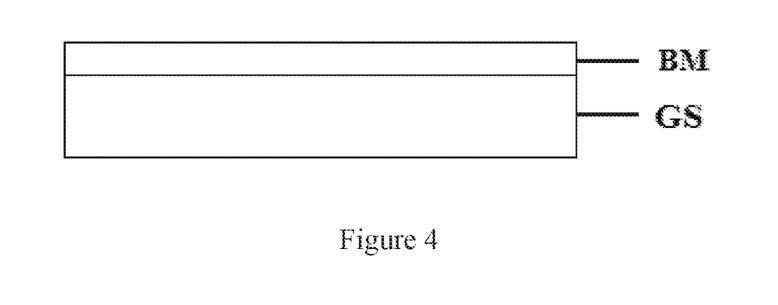
FIG. 4 is a schematic cross-sectional view of the touch screen of the embodiment shown in FIG. 2 after the first step of production is completed.

FIG. 3 is a schematic top view of the touch screen of the embodiment shown in FIG. 2 after the first step of production is completed. FIG. 4 is a schematic cross-sectional view of the touch screen of the embodiment shown in FIG. 2 after the first step of production is completed. As shown in FIGS. 3 and 4, the first step is to produce a BM (Black Matrix) layer based on a glass substrate GS. The BM layer is coated on the glass substrate GS and removed by the photo etching process so that the BM layer is not present in the touch region 3 and the BM layer is present only in the bezel region 2.

Figure 5:
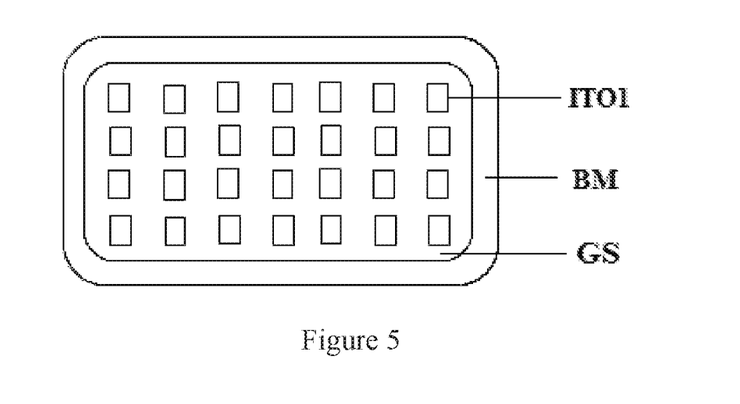
FIG. 5 is a schematic top view of the touch screen of the embodiment shown in FIG. 2 after the second step of production is completed.
Figure 6:
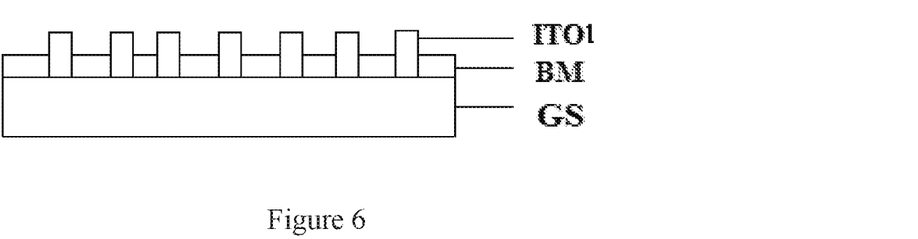
FIG. 6 is a schematic cross-sectional view of the touch screen of the embodiment shown in FIG. 2 after the second step of production is completed.

FIG. 5 is a schematic top view of the touch screen of the embodiment shown in FIG. 2 after the second step of production is completed. FIG. 6 is a schematic cross-sectional view of the touch screen of the embodiment shown in FIG. 2 after the second step of production is completed. As shown in FIGS. 5 and 6, the first electrode layer ITO' is formed in the second step, and the first electrode layer ITO' is formed in the portion of the touch region 3 on the glass substrate GS which is not covered by the BM layer. The first electrode layer ITO' includes a plurality of first electrodes.

Figure 7:
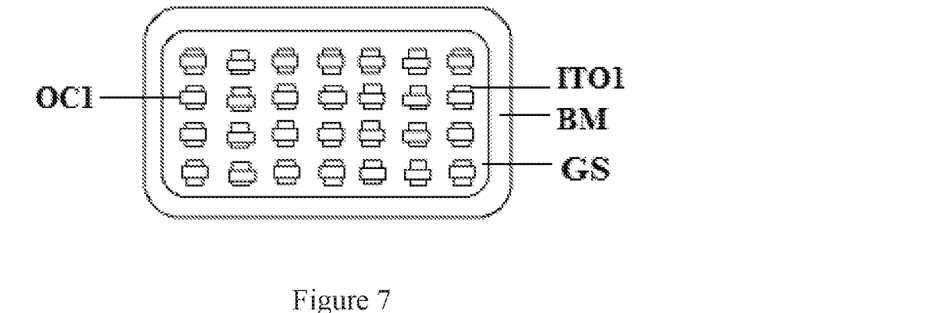
FIG. 7 is a schematic top view of the touch screen of the embodiment shown in FIG. 2 after the third step of production is completed.
Figure 8:
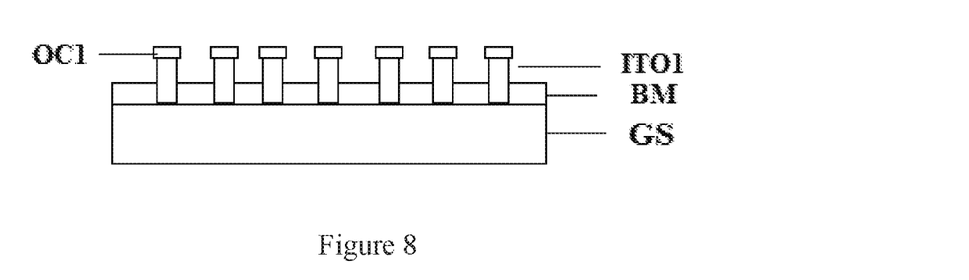
FIG. 8 is a schematic cross-sectional view of the touch screen of the embodiment shown in FIG. 2 after the third step of production is completed.

FIG. 7 is a schematic top view of the touch screen of the embodiment shown in FIG. 2 after the third step of production is completed. FIG. 8 is a schematic cross-sectional view of the touch screen of the embodiment shown in FIG. 2 after the third step of production is completed. As shown in FIGS. 7 and 8, the first protective layer OC(Over Coat)1 is produced in the third step in a manner of partially covering, that is, it is only formed on the first electrode, plays the role of insulation, and avoids poor adhesion of other layers onto the first protective layer OC1.

Figure 9:
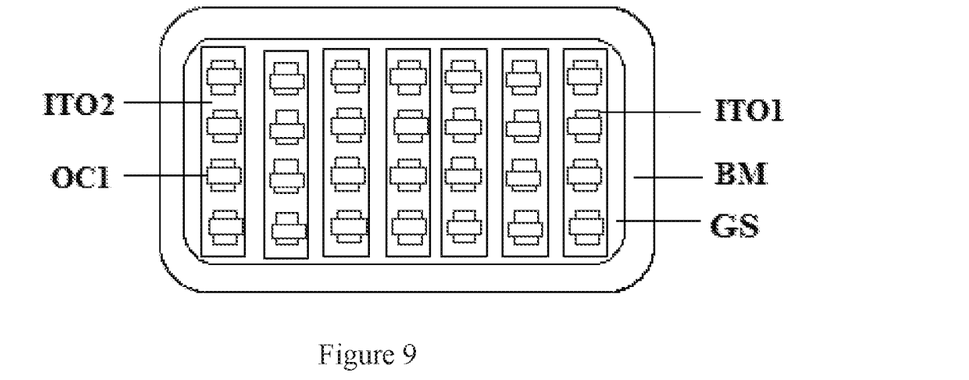
FIG. 9 is a schematic top view of the touch screen of the embodiment shown in FIG. 2 after the fourth step of production is completed.
Figure 10:
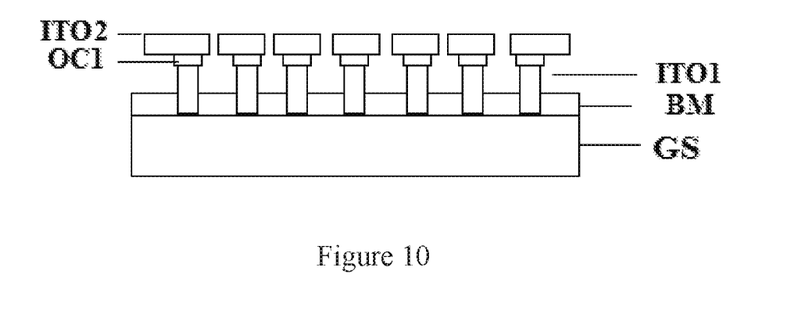
FIG. 10 is a schematic cross-sectional view of the touch screen of the embodiment shown in FIG. 2 after the fourth step of production is completed.

FIG. 9 is a schematic top view of the touch screen of the embodiment shown in FIG. 2 after the fourth step of production is completed. FIG. 10 is a schematic cross-sectional view of the touch screen of the embodiment shown in FIG. 2 after the fourth step of production is completed. As shown in FIGS. 9 and 10, the second electrode layer ITO2 is formed in the fourth step, and the second electrode layer ITO2 constitutes an electrode pattern (ITO pattern) including a plurality of second electrodes. The second electrode layer ITO2 constitutes a touch signal transmission/reception (Tx/Rx) channel in cooperation with the first electrode layer ITO1 and the first protective layer OC1.

Figure 11:
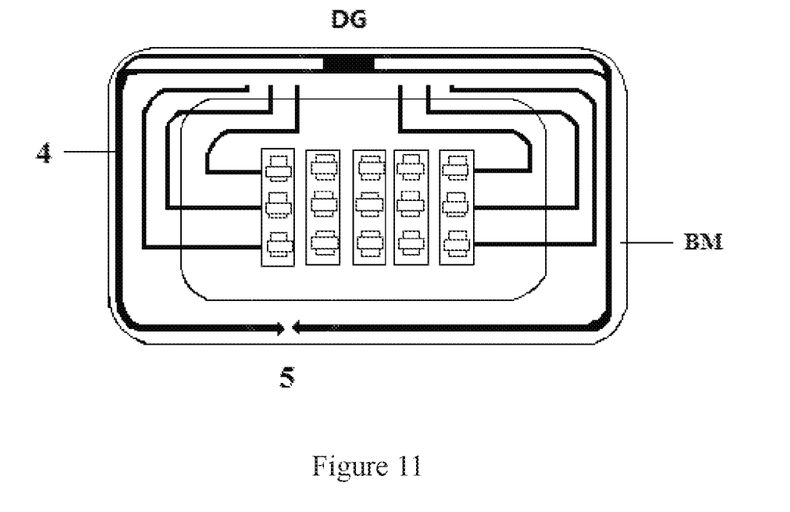
FIG. 11 is a schematic top view of the touch screen of the embodiment shown in FIG. 2 after the fifth step of production is completed.
Figure 12:
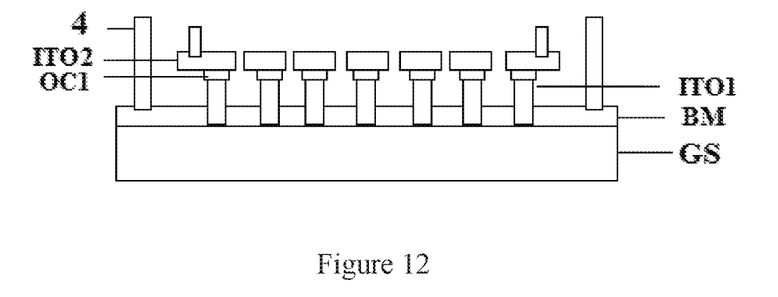
FIG. 12 is a schematic cross-sectional view of the touch screen of the embodiment shown in FIG. 2 after the fifth step of production is completed.

FIG. 11 is a schematic top view of the touch screen of the embodiment shown in FIG. 2 after the fifth step of production is completed. FIG. 12 is a schematic cross-sectional view of the touch screen of the embodiment shown in FIG. 2 after the fifth step of production is completed. As shown in FIGS. 11 and 12, the circuit layer is formed in the fifth step, and the wire 4 is included in the circuit layer. Also, in this step, the wiring for connecting the electrodes is also produced. The wiring connecting the electrodes leads to a region corresponding to the BM layer in the bezel region 2 to form a bonding region (Bonding Pad) for the connection between the touch screen 1 and an external circuit. Compared with the prior art, the circuit layer is produced in exactly the same way, except that the pattern of the wire 4 is added when the pattern of the circuit layer is formed. Thus, according to the present embodiment, the wire 4 can be formed without adding the number of additional production steps.

Figure 13:
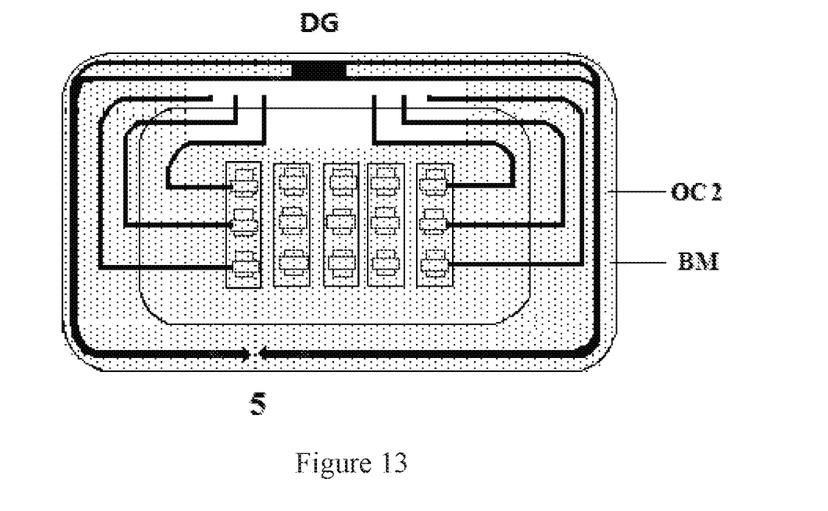
FIG. 13 is a schematic top view of the touch screen of the embodiment shown in FIG. 2 after the sixth step of production is completed.
Figure 14:
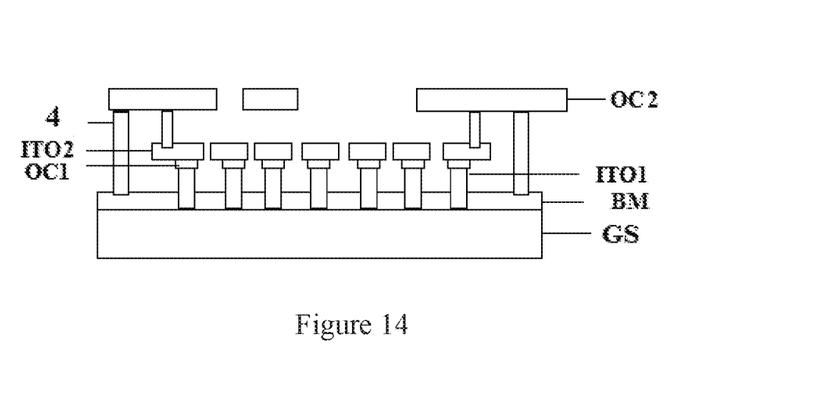
FIG. 14 is a schematic cross-sectional view of the touch screen of the embodiment shown in FIG. 2 after the sixth step of production is completed.

FIG. 13 is a schematic top view of the touch screen of the embodiment shown in FIG. 2 after the sixth step of production is completed. FIG. 14 is a schematic cross-sectional view of the touch screen of the embodiment shown in FIG. 2 after the sixth step of production is completed. As shown in FIGS. 13 and 14, the second protective layer OC2 is formed in the sixth step, in a manner of entirely covering, and covers the bezel region 2 and the touch region 3. The second protective layer OC2 opens at the positions of the bonding region and the dummy region DG, so that the bonding region and the dummy ground DG are exposed. The second protective layer OC2 may implement protection for the wire 4, preventing the wire 4 from being exposed to air and being corroded.

Figure 15:
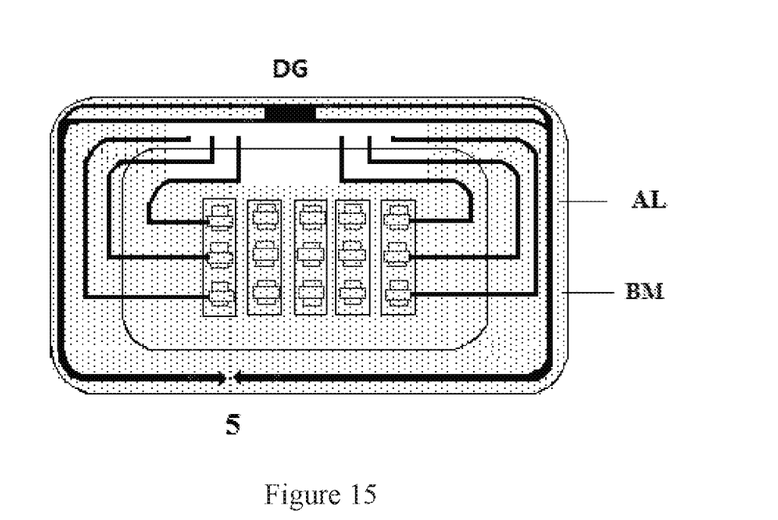
FIG. 15 is a schematic top view of the touch screen of the embodiment shown in FIG. 2 after the seventh step of production is completed.
Figure 16:
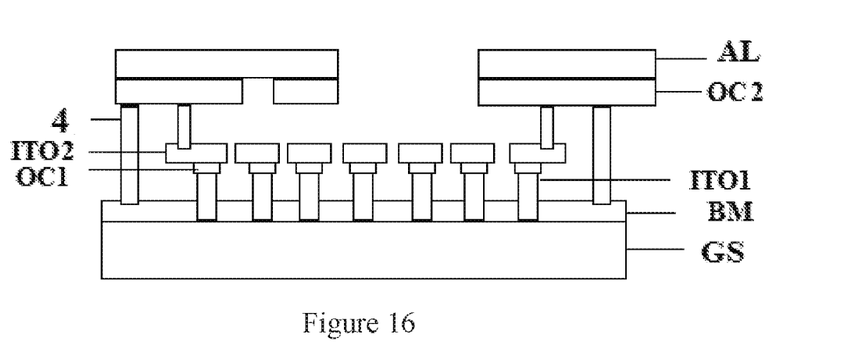
FIG. 16 is a schematic cross-sectional view of the touch screen of the embodiment shown in FIG. 2 after the seventh step of production is completed.

FIG. 15 is a schematic top view of the touch screen of the embodiment shown in FIG. 2 after the seventh step of production is completed. FIG. 16 is a schematic cross-sectional view of the touch screen of the embodiment shown in FIG. 2 after the seventh step of production is completed. As shown in FIGS. 15 and 16, a strippable adhesive layer AL is produced, which covers the protective layer and the dummy ground DG, leaving only the position of the bonding region exposed, therefor further achieving the protection for the dummy ground DG, and the strippable adhesive can be used to bond conductive foam and other components.

In an embodiment, a shadow layer composed of SiO2/SiON or the like may be further produced after the sixth step is completed, if necessary.

In the present embodiment, although the description is given by example of the 6 Mask method, the way to implement the touch screen is not limited thereto, and the 4 Mask method, the 5 Mask method, and the like may also be used for the implementation.

The touch screen provided by the embodiments of the present disclosure can be well applied to electronic devices such as Table Personal Computer/Notebook/Monitor (TPC/NB/MNT).

In the present embodiment, in order to further enhance the function of electrostatic transfer, it is possible to connect the dummy ground DG and the device housing with the conductive foam when assembling the device housing.

A third embodiment of the present disclosure provides a device including the above-described touch screen 1, the device further including a conductive foam configured to connect the wire 4 of the touch screen 1 and the housing of the device. This will improve the overall ESD resistance of the device.

In an embodiment of the present disclosure, the conductive foam may be connected to the dummy ground DG. Thus the conductive ability between the wire 4 and the device housing is stronger, and the overall ESD resistance of the device can be further improved.

According to an embodiment of the present disclosure, the ESD resistance of the touch screen and the device including the touch screen is enhanced, the service life of the touch screen and the device including the touch screen is extended, the stability of the touch screen and the device including the touch screen is improved, and customers will have a better user experience without any other additional risk.

It may be understood that the above embodiments are merely exemplary embodiments for the purpose of illustrating the principles of the present disclosure, but the present disclosure is not limited thereto. Those of ordinary skill in the art may make various modifications and improvements without departing from the spirit and essence of the present disclosure, which are also considered to be within the scope of protection sought for by the present disclosure.

What is claimed is:

1. A touch screen comprising:
    a bezel region; and
    a touch region, wherein the touch screen comprises an annular wire provided on the bezel region, wherein the annular wire comprises at least one pair of opposing discharge terminals, and wherein the annular wire further comprises a dummy ground, wherein a width of the dummy ground is greater than a width of the other regions of the annular wire;
    wherein the annular wire comprising the dummy ground is included in a circuit layer of the touch screen;
    wherein the circuit layer further comprises:
    a wiring for connecting the electrodes, wherein the annular wire and the wiring for connecting the electrodes are formed in the circuit layer in a single production step;
    wherein the annular wire is on a black matrix layer; and
    wherein the wiring connecting the electrodes to a region on the black matrix layer in the bezel region to form a bonding region for a connection between the touch screen and an external circuit.

2. The touch screen according to claim 1, wherein each discharge terminal is a sharp end.

3. The touch screen according to claim 1, wherein the touch screen further comprises a protective layer, wherein the protective layer covers the bezel region and the touch region, and wherein the protective layer opens at a position corresponding to the dummy ground and at a position corresponding to a bonding region for connecting the touch screen and an external circuit.

4. The touch screen according to claim 3, wherein the touch screen further comprises a strippable adhesive layer, and wherein the strippable adhesive layer covers the protective layer and the dummy ground.

5. The touch screen according to claim 1, wherein the annular wire is made of metal.

6. A device comprising a touch screen, wherein the touch screen comprises a bezel region and a touch region, wherein the touch screen comprises an annular wire provided on the bezel region, and wherein the device further comprises a conductive foam configured to connect the annular wire of the touch screen and a housing of the device,
    wherein the annular wire comprises a dummy ground having a width greater than the other regions of the annular wire, and wherein the conductive foam is connected to the dummy ground;
    wherein the annular wire comprising the dummy ground is included in a circuit layer of the touch screen;
    wherein the circuit layer further comprises:
    a wiring for connecting electrodes;
    wherein the annular wire and the wiring for connecting the electrodes are formed in the circuit layer in a single production step;
    wherein the annular wire is on a black matrix layer; and
    wherein the wiring connecting the electrodes leads to a region on the black matrix layer in the bezel region to form a bonding region for a connection between the touch screen and an external circuit.

7. The device according to claim 6, wherein the annular wire comprises at least one pair of opposing discharge terminals.

8. The device according to claim 7, wherein each discharge terminal is a sharp end.

9. The device according to claim 6, wherein the touch screen further comprises a protective layer, wherein the protective layer covers the bezel region and the touch region, and wherein the protective layer opens at a position corresponding to the dummy ground and at a position corresponding to a bonding region for connecting the touch screen and an external circuit.

10. The device according to claim 9, wherein the touch screen further comprises a strippable adhesive layer, and wherein the strippable adhesive layer covers the protective layer and the dummy ground.

11. The device according to claim 6, wherein the annular wire is made of metal.

\* \* \* \* \*

UNITED STATES PATENT AND TRADEMARK OFFICE
CERTIFICATE OF CORRECTION

| | | |
|---|---|---|
| PATENT NO. | : 10,409,403 B2 | Page 1 of 1 |
| APPLICATION NO. | : 15/528431 | |
| DATED | : September 10, 2019 | |
| INVENTOR(S) | : Lingyan Wu et al. | |

It is certified that error appears in the above-identified patent and that said Letters Patent is hereby corrected as shown below:

In the Specification

Column 4, Line 27, delete "first electrode layer ITO'" and insert therefor -- first electrode layer ITO1 --.
Column 4, Line 28, delete "first electrode layer ITO'" and insert therefor -- first electrode layer ITO1 --.
Column 4, Lines 30-31, delete "first electrode layer ITO'" and insert therefor -- first electrode layer ITO1 --.

Signed and Sealed this
Twelfth Day of November, 2019

Andrei Iancu
*Director of the United States Patent and Trademark Office*